US012809846B2

(12) United States Patent
Eberlein et al.

(10) Patent No.: US 12,809,846 B2
(45) Date of Patent: Nov. 24, 2026

(54) CONSISTENT SELECTION OF SUBSETS OF STRONGLY RELATED APPLICATION DATA

(71) Applicant: SAP SE, Walldorf (DE)

(72) Inventors: Peter Eberlein, Malsch (DE); Volker Driesen, Heidelberg (DE)

(73) Assignee: SAP SE, Walldorf (DE)

( * ) Notice: Subject to any disclaimer, the term of this patent is extended or adjusted under 35 U.S.C. 154(b) by 38 days.

(21) Appl. No.: 18/943,118

(22) Filed: Nov. 11, 2024

(65) Prior Publication Data

US 2026/0133951 A1 May 14, 2026

(51) Int. Cl.
*G06F 16/22* (2019.01)
*G06F 16/2455* (2019.01)

(52) U.S. Cl.
CPC .... *G06F 16/2282* (2019.01); *G06F 16/24566* (2019.01)

(58) Field of Classification Search
CPC .................................................. G06F 16/2282
USPC .......................................................... 707/741
See application file for complete search history.

(56) References Cited

U.S. PATENT DOCUMENTS 11,551,141 B2 1/2023 Driesen
11,797,879 B2 * 10/2023 Eberlein ............. G06F 21/6245
2016/0147809 A1 * 5/2016 Schreter .............. G06F 11/1446 707/746
2021/0065040 A1 3/2021 Eberlein et al.
2022/0383154 A1 12/2022 Eberlein et al.
2024/0354322 A1 * 10/2024 Mukherjee .......... G06F 16/3344
2025/0238536 A1 * 7/2025 Nikoghossian ....... G06F 21/602

OTHER PUBLICATIONS

U.S. Appl. No. 18/812,178, filed Aug. 22, 2024, Eberlein et al.

* cited by examiner

*Primary Examiner* — Muluemebet Gurmu
(74) *Attorney, Agent, or Firm* — Fish & Richardson P.C.

(57) ABSTRACT

A computer-implemented method for data configuration and export includes reading, by a data set export system (DSES), a configured export data set (EDS) definition (EDSD) instance. The DSES reads related metadata. The DSES reads keys of an application object or database table from a customer database. The DSES follows defined relations to more application objects to be exported. The DSES stores determined keys of application objects and database tables, where, for each application object and database table, the DSES writes identified keys to an export keys database table. The DSES exports a data set, where the data set includes specified attributes from customer data associated with export keys read by the DSES.

20 Claims, 5 Drawing Sheets

400

CONSISTENT SELECTION OF SUBSETS OF STRONGLY RELATED APPLICATION DATA

BACKGROUND

It is often desired to use data associated with software applications having rich and complex data models in machine learning (ML) or generative artificial intelligence (AI) (genAI) use cases. For an AI scenario, typically data is required to train or fine-tune a model or obtain content for a retrieval augmented generation system. Typically, such data is spread in a database (DB) in a variety of tables, partially related in data models or DB foreign-key relations, but also related semantically only within an application layer. For some applications, data is modeled in multiple application objects (AOs), where the AOs are related. Forming a comprehensive and semantically consistent data set requires combinations of data from different AOs and respecting associations and foreign key relations between AOs and additional DB tables. Legal constraints may also exist with respect to data (e.g., personally identifying information (PII) or jurisdictionally specific). Technical constraints can also exist (e.g., data is archived or in cold storage and must first be reactivated).

SUMMARY

The present disclosure describes consistent selection of subsets of strongly related application data.

In an implementation, a computer-implemented method for data configuration and export, comprises: reading, by a data set export system (DSES), a configured export data set (EDS) definition (EDSD) instance; reading, by the DSES, related metadata; reading, by the DSES, keys of an application object or database table from a customer database; following, by the DSES, defined relations to more application objects to be exported; storing, by the DSES, determined keys of application objects and database tables, wherein, for each application object and database table, the DSES writes identified keys to an export keys database table; and exporting, by the DSES, a data set, wherein the data set comprises specified attributes from customer data associated with export keys read by the DSES.

The described subject matter can be implemented using a computer-implemented method; a non-transitory, computer-readable medium storing computer-readable instructions to perform the computer-implemented method; and a computer-implemented system comprising one or more computer memory devices interoperably coupled with one or more computers and having tangible, non-transitory, machine-readable media storing instructions that, when executed by the one or more computers, perform the computer-implemented method/the computer-readable instructions stored on the non-transitory, computer-readable medium.

The subject matter described in this specification can be implemented to realize one or more of the following advantages. First, without additional support in the application, a machine learning (ML) engineer would either export data with database (DB) access or write a custom software application reading data using available application programming interfaces (APIs) from the software application and store data in file system (or a data lake or DB) for further processing. Both approaches are cumbersome and require a lot of additional programming effort and manual effort to create data sets for ML. With the described approach, a semantically rich and simple data model is provided, which is tailored for the needs of a data-oriented ML engineer. Relations and filter criteria are provided and named, which is easier to use and understand. Second, the described approach permits creating a consistent export even during continued use of the software application, as keys to be exported are computed in one (fast) run and not during a (long running) data export. Third, the described approach provides easy control of application objects (AOs) to be exported, and several options are provided: 1) export only referenced AOs of a certain type; 2) all AOs of a certain type; 3) or filtered according to provided filter criteria. Fifth, the described approach permits creating consistent export of deltas for iterative training runs, either for data newly created during a certain period of time, or when a ML Engineer adjusts a data export configuration. Sixth, the described approach permits a ML engineer to define AO sets (data sets), related to other AOs using associations, and mapped to DB table rows. Data set definitions are used to verify completeness and/or interestingness based on user data and data set definitions can be adjusted if necessary.

The details of one or more implementations of the subject matter of this specification are set forth in the Detailed Description, the Claims, and the accompanying drawings. Other features, aspects, and advantages of the subject matter will become apparent to those of ordinary skill in the art from the Detailed Description, the Claims, and the accompanying drawings.

DESCRIPTION OF DRAWINGS

Like reference numbers and designations in the various drawings indicate like elements.

DETAILED DESCRIPTION

Figure 1:
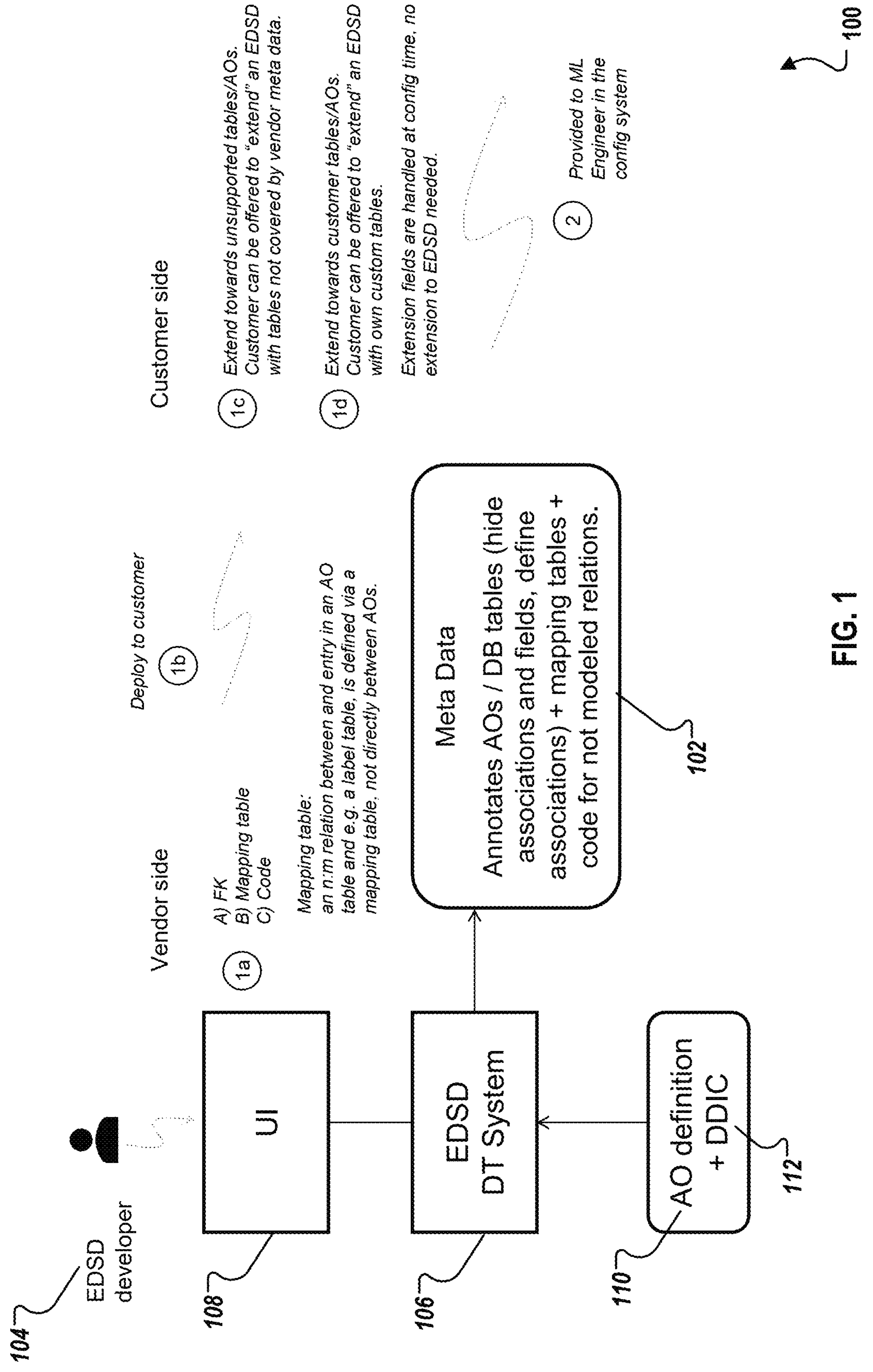
FIG. 1 is a block diagram of a development process for consistent selection of subsets of strongly related application data, according to an implementation of the present disclosure.

The following detailed description describes consistent selection of subsets of strongly related application data and is presented to enable any person skilled in the art to make and use the disclosed subject matter in the context of one or more particular implementations. Various modifications, alterations, and permutations of the disclosed implementations can be made and will be readily apparent to those of ordinary skill in the art, and the general principles defined can be applied to other implementations and applications, without departing from the scope of the present disclosure. In some instances, one or more technical details that are unnecessary to obtain an understanding of the described subject matter and that are within the skill of one of ordinary skill in the art may be omitted so as to not obscure one or more described implementations. The present disclosure is not intended to be limited to the described or illustrated implementations, but to be accorded the widest scope consistent with the described principles and features.

At a high-level, a described approach permits a machine learning (ML) engineer to define application object (AO) sets (data sets), related to other AOs using associations, and mapped to database (DB) table rows. Data set definitions are used to verify completeness and/or interestingness based on user data and data set definitions can be adjusted if necessary. A data set definition can be used to export data consistently for use in ML scenarios, where data set consistency is established even if a software application system is in use and creates new records.

It is often desired to use data associated with software applications having rich and complex data models in machine learning (ML) or generative artificial intelligence (AI) (genAI) use cases. For an AI scenario, typically data is required to train or fine-tune a model or obtain content for a retrieval augmented generation system. Typically, such data is spread in a database (DB) in a variety of tables, partially related in data models or DB foreign-key relations, but also related semantically only within an application layer. For some applications, data is modeled in multiple application objects (AOs), where the AOs are related.

It is assumed that it is not sufficient for an AI scenario to use content of only one AO but of several, and that the data set is strongly related. For AI, a comprehensive and semantically consistent data set is desired. Forming a comprehensive and semantically consistent data set requires combinations of data from different AOs (if related) and respecting associations and foreign key relations between AOs and additional DB tables. A constraint on data being provided to an AI is, that data shall be exported as referentially consistent and with AOs written completely including related objects.

A user should be permitted to define a set of attributes of a set of AOs and DB tables limited to a range of values of the one or other attribute or to export all data records (i.e., for terminology or to obtain a full range of data values possible for one data element).

Relations between data records in DB tables can be defined in an application-level data dictionary (DDIC), relations between AOs are typically defined in an AO data model. Such relations are defined as a foreign key relationship, associations, or attribute relationship. In addition, relations can point to content in configuration tables (such as, rules for rebate management). Potentially the relations are not explicitly defined as foreign key relationships between DB tables, but are instead defined by an implementation of lookup rules. A user should be enabled to select such sets based on relations defined in data models, but also be enabled to amend the definition by user defined rules or even code.

In addition to demands on exported data, legal constraints may also exist with respect to data (e.g., personally identifying information (PII) or jurisdictionally specific). For training models (potentially for broad use), legal constraints need to be taken into account.

Technical constraints can also exist (e.g., data is archived or in cold storage). Exporting such data may incur costs as it needs to be reactivated from cold storage first, which can impact productive system performance. Exporting data should be planned/executed carefully and likely only rarely as this data should not change frequently. In future exports, it should be considered to exclude already exported data. A user should be enabled to take technical constraints into account for modeling/coding.

The described approach can be used to solve/mitigate several problems in current technology.

A consistent subset of data is needed.

In some cases, a subset of software application data is needed for ML training or large language model (LLM) fine-tuning (i.e., a ML process). For example, exporting a complete DB can be, on one hand, legally questionable, as a PII-related data export or use of data for training outside a jurisdiction of its origin may be legally constrained or undesired from a customer/user perspective. In this case, a selection of a subset is required.

Data ranges needed.

In some cases, of selected DB tables, only a set of key ranges may be desired for ML use. Desired data in training is data which is not outdated or otherwise invalidated (to prevent learning from "wrong" data) and is not used/exported for ML access.

Data required for a ML process is distributed across several DB tables that need to be exported consistently.

In some cases, data needs to be exported from a set of DB tables, where potentially only selected columns of the set of DB tables are desired. The DB tables may be related by foreign keys or otherwise (such as, relationships implemented in coding).

If only a certain key range of data is exported from one DB table, then an export from related tables must be restricted to data that is referenced from the primary DB table. Exporting full DB tables would include unreferenced data that could make the export inconsistent.

Excluding restricted data.

Only allowed data should be considered (e.g., exclude personal data-such as PII and data from jurisdictions with special legal restriction). Using other data in ML can lead to legal problems.

Relations are defined using foreign key relationships, object attributes, or relations to content keys or attributes. Some relations are not defined as a reference between data records, but only present in software code.

For a consistent subset of data, data to be exported needs to be selected from several DB tables, where the records of the DB tables selected along foreign key relationships or other relations. For example, in purchasing, quantity discounts are defined for purchasing a quantity (or for a purchasing sum) of number of items (e.g., of potentially many products of different categories). Such relations are only known to developers and are present in software application code. The relations must be specified using software code modules and not foreign key relationships in the data. For example, quantity discounts can be stored in one (config) table (such as, 2-5=5% off, 6-20=10% off) but there is no foreign key relationship to this table, as the lookup of the actual discount is done in code after determining the correct range (e.g., 3 pieces→lookup discount of 2-5 range).

Data in archives and cold storage are expensive to retrieve or can disrupt productive use of a system.

If data is to be loaded from an archive, an archiving system needs to be queried. If this is desired, a separate process is required and should be done only once. Frequent or recurring access to archive is resource intensive and slow. Similarly, access to cold storage and load to main memory is problematic, as memory limits might be hit. If memory limits are hit, productive system performance may be impacted.

The described approach provides a design-time infrastructure for developers of a software application to provide metadata and code modules defining relations together with the software application. The metadata enables configuring export data set (EDS) definitions (EDSD). A user of a software application (e.g., a ML engineer of a customer) can configure EDSDs in a tool-supported way. An export data set definition is used by a runtime software application to export data as selected by users consistently from a DB to an external storage. The external data set is used by an ML process (i.e., a ML training, LLM fine-tuning, or another AI consumer).

The design-time infrastructure (e.g., at a vendor) enables a developer to define metadata needed for configuring and performing an EDSD export. The metadata definitions comprise AOs, associations between AO attributes, relations to DB tables, and foreign key relationships between DB tables as well as code modules, which implement relations between AO instances and DB table records or other data storage. The metadata is made available to a customer using the approach with the software application. If desired, a customer-side ML engineer can be provided access to the design-time infrastructure to add custom user relations (e.g., to custom database objects as extensions to the metadata provided by a vendor). In a scenario where a customer is adding custom metadata for customer relations, the persona would be a customer-side developer not a customer-side ML engineer. To enable the functionality, the infrastructure of the described approach has access to data models, including AO definitions, DDIC, and definitions of references between AOs.

The customer user (i.e., the ML engineer), is provided an EDSD configuration-time system that supports the ML engineer at configuring consistent EDSDs. The EDSD configuration-time system has access to the metadata provided by the vendor and potentially being extended by the customer-side developer. The EDSD configuration-time system has access to AO definitions and DB table definitions and enables the ML engineer to select desired attributes and DB table fields to be exported for a specified AO type and DB table, including customer extension attributes and data records being related in code modules which program those relations which are not accessible from modeling. The EDSD configuration-time system allows testing an export of EDSDs configured by the ML engineer, so the ML engineer can view data sets and iterate on improving the configuration.

EDSDs also contain key ranges for one or several AOs, usually in a form of a SELECT-type query. The design-time system also has access to information about where data is located based on key ranges (either in archive or in cold storage (e.g., on disc) in memory (e.g., if assuming an SAP HANA like in memory DB). A select query specified by a ML engineer can then be checked against this information to inform the ML engineer if the selection would access an archive or cold storage. Ranges of related AOs and of items in header-item relations can be specified either implicitly, taking all related instances to those of a leading AO, or the related AO range can be extended or limited (filtered) by the ML engineer.

The EDSD is used to run an export of the data set by a data set export system (DSES). The export runs in two phases: 1) first the key attributes of the selected data records for the different tables are written to an "export key table" and 2) then the key list is used to query the AO data for export.

The EDSD is used to compute keys of DB table records to be exported. The select query (key range) of the leading AO is taken from the EDSD, the key of the AO in this desired range are read and the keys of the respective DB tables of the AO are stored. Related AOs that are part of the EDSD are identified, the instances related to instance of the leading AO keys part of the desired range are identified, and keys of the DB tables for the related AO are stored. This approach is continued iteratively for all relations that are part of the EDSD. In this way, a convex envelope of desired and related objects is computed. For all AOs defined in the EDSD, desired keys of the DB tables where the AOs are persisted, are stored.

This stage permits checking completeness of the data set and analyzing value histograms, etc. Attributes of the AOs, which are specified for export in the EDSD, can be read for all stored keys to be exported. This permits showing which attributes are initial or of a value not desired by the ML engineer (e.g., for open order). Similarly, for selected attributes, a value histogram can be computed and displayed, providing the ML engineer more information to optimize the EDSD.

In phase two, on the DSES, the export runs reading the keys from an export key table and querying attributes of the AOs defined in the EDSD for export. In this way, new entries in specified key ranges created during the export in key ranges are not considered, and taking a snapshot of the initial key-determination run.

The described approach enables an ML engineer to define and use an EDSD and for repetitive export runs, iteratively optimizing towards a desired data set (AOs, their attributes, and key ranges), ensuring obtaining a consistent dataset for ML evaluations. Since a data export can result in a performance impact to the DB the data is exported from and can create considerable data volume with export files, a delta handling is useful. In delta handling, a change to an EDSD can be considered for delta export: the export system then compares with the definition of the last run and, if the delta is additional rows and more attributes/columns, a delta export can be done. The delta export exports the additional rows, and only if additional attributes are specified, exports all the keys for the AO again where the additional attributes are specified. For other scenarios, a new EDSD can be defined, and the complete data set can be exported.

Optionally, extended assistance can be provided during creation of an EDSD. In some implementations, extended analysis can include: 1) analysis of data distribution/histogram of individual attributes of a defined "export data set," if an attribute is used which only has (e.g., one value), the attribute might be obsolete for the desired activity; 2) analysis of ML training reports, which data attributes are (e.g., strongly correlated) and thus a reduced data set could be used in the next iteration of data export and ML process; and 3) if a consumer of the data is a ML in training, numbers and identifiers (IDs) in data exports are typically preferable, while for an LLM consumer, an ID and number translated to a short text before the export (e.g., reading the short text from a related ID-text mapping table) is preferrable.

Turning to FIG. 1, FIG. 1 is a block diagram of a development process 100 for consistent selection of subsets of strongly related application data, according to an implementation of the present disclosure.

Metadata 102 later used by an EDSD configuration-time (CT) system is defined/stored by a EDSD developer 104 (vendor-side) and then made available to a customer ML engineer together with the software application.

At (1*a*), metadata 102 is created. The EDSD developer 104 defines metadata for use in an EDSD development time (DT) system 106 and associated user interface (UI) 108 (e.g., a configuration UI) to create the metadata 102. The EDSD DT system 106 can view the metadata 102 and DDIC 112 (e.g., tables, structures, and foreign key definitions).

Metadata can be: 1) associations between AOs; 2) semantically enriched associations (e.g., with additional attributes; 3) filtered association—relations between DB tables are specified in a dedicated DB table with additional attributes on annotations (e.g., adding a role to an association, which can be used for filtering, which association to use (e.g., in FIG. 3, "Order" <<customer>> "Business Partner"); 4) if a filtered association is not available in the application object model, the EDSD developer 104 can provide similar implementation in code; 5) a select all entries, with an association with attribute value X to get the superset of all object instances in one table of one kind; 6) a mapping table, that relates entries in one of the selected AOs to data stored in other tables; 7) a standard code module, which relates records in one AO to another AO or to other data records; 8) a foreign key relationship between DB tables; and 9) hidden (e.g. technical) fields, which are not useful for export. An EDSD developer 104 has access to: 1) AO definitions 110: names, attributes, and associations; 2) DDIC 112; and 3) code repository (not illustrated). From (1*a*), development process 100 proceeds to (1*b*).

At 1(*b*), metadata 102 and code are deployed to the software application system used by the customer. In some implementations, the metadata 102 is made available to the customer using a custom UI in the software application. From (1*b*), development process 100 proceeds optionally to (1*c*) or to (2).

Optionally, at (1*c*), an EDSD developer 104 can extend metadata 102 to add EDSD support for DB tables and AOs not covered by vendor metadata. This enables customers to overcome limits from predefining on the vendor-side which data (whether manifested as data objects or simple DB tables) could be used for training. In some implementations, an EDSD developer 104 can create an extension to the metadata 102 and maybe even write custom code. In some implementations, the EDSD developer 104 can add existing AOs or DB tables related to AOs and DB tables that are part of the EDSD definition. From (1*c*), development process 100 proceeds optionally to (1*d*) or to (2).

Optionally, at (1*d*), an EDSD developer 104 can extend metadata 102 to add EDSD support for custom DB tables and custom AOs. This enables customers to use extension data unique to the customer for training. In some implementations, an EDSD developer 104 can create an extension to the metadata 102 and maybe even write custom code. In some implementations, the EDSD developer 104 can add custom AOs or DB tables related to AOs and DB tables that are part of the EDSD definition. From (1*d*), development process (1*d*) proceeds to (2).

At (2), the ML engineer (a customer ML engineer) can access the metadata in the customer software application. The metadata 102 is made available to the customer for use in a configuration UI.

Figure 2:
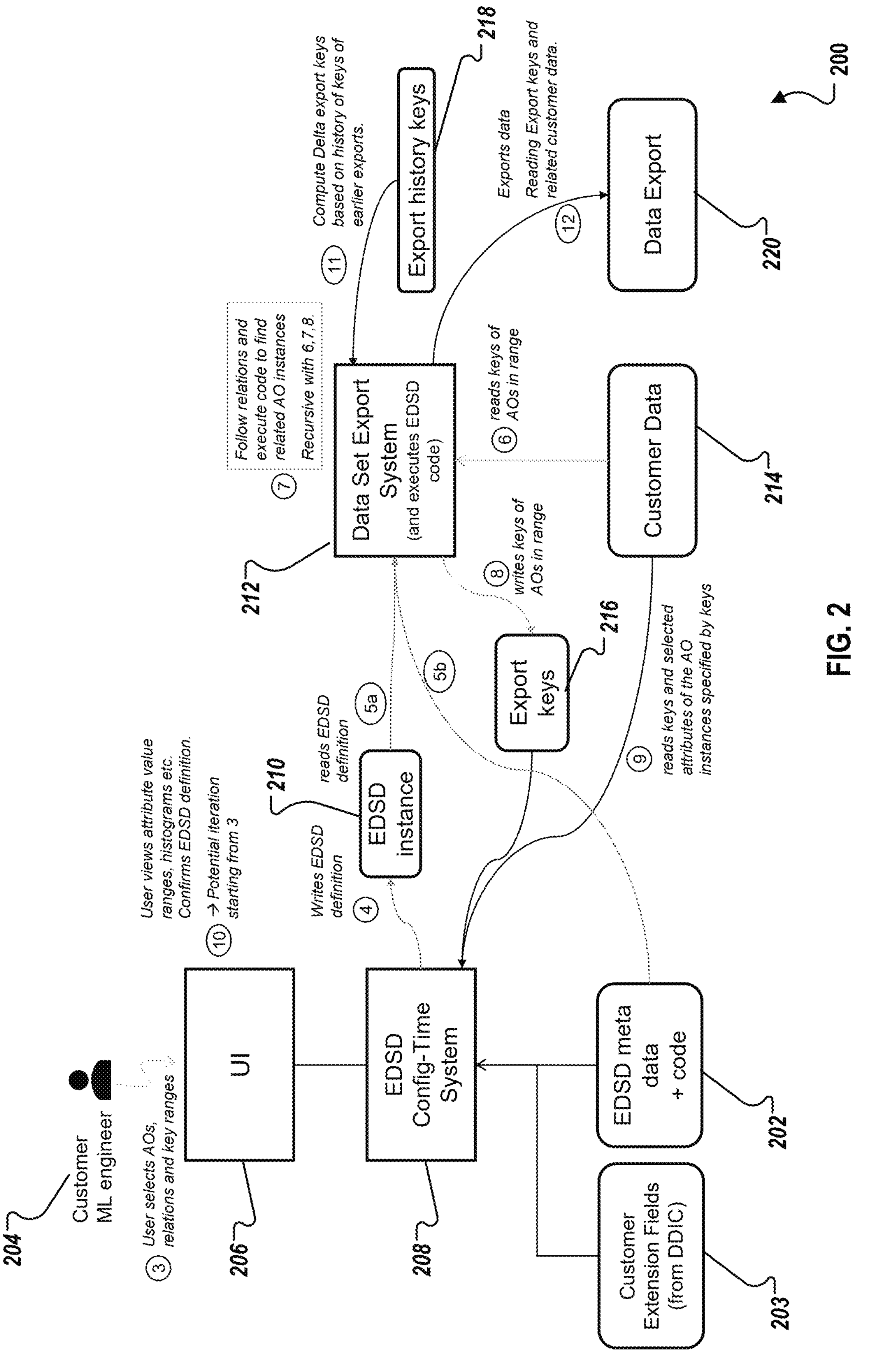
FIG. 2 is a block diagram of a data configuration and export process for consistent selection of subsets of strongly related application data, according to an implementation of the present disclosure.

FIG. 2 is a block diagram of a data configuration and export process 200 for consistent selection of subsets of strongly related application data, according to an implementation of the present disclosure.

EDSD metadata+code 202 and customer extension fields 203 from the DDIC 112 is made accessible to a customer ML engineer 204 using a EDSD configuration UI 206 of an EDSD configuration-time (CT) system 208.

An EDSD CT system 208 has a configuration UI 206, where a customer ML engineer 204 can: 1) configure an EDSD instance; 2) define key ranges for AOs to be selected; and 3) define desired attributes or DB table fields to be selected. The EDSD CT system 208 can store an EDSD instance for use by the "data set export" system. The EDSD CT system 208 can read key lists written by the "data set export" system. The EDSD CT system 208 can access customer data for key lists specified by the "data set export" system in the "export keys." The EDSD CT system 208 can visualize data statistics for the read customer data.

At (3), an EDSD is configured. The customer ML Engineer 204 selects an AO and uses the metadata 202 to select further related AOs or DB tables. Note the metadata 202 includes code and customer extension fields. However, this is transparent to the customer ML engineer 204, as, they see that they can follow a relation to some other object/field. If this object/field is an extension or if the relationship is resolved by a JOIN using a foreign key or if a code module is called, they would not know).

The customer ML Engineer selects per AO the desired attributes to be exported and, for DB tables, the desired columns. The customer ML Engineer 204 specifies key-ranges for one AO to be exported, the system visualizes, that default key ranges of related AOs will be derived from actual data. The customer ML Engineer 204 can specify key-ranges for the related AOs and overwrite the default, the compute key ranges of related AOs (e.g., to reduce the number or instances), or to increase the number of desired instances of the related AO to be exported. From (3), the data configuration and export process 200 proceeds to (4).

At (4), the EDSD CT system 208 writes a configured EDSD instance 210. The configured EDSD instance 210 is stored to be read by a DSES 212. The DSES 212 can read a configured EDSD (EDSD instance 210) and related metadata 202 written by the EDSD DT system 106. The DSES 212 can access customer data and extract key lists of AOs defined by EDSD. The DSES 212 can follow relations to other AOs as defined by EDSD and extract additional keys of AOs (recursively). The DSES 212 can read key lists and read related AO attributes as specified in EDSD and export data.

The customer ML engineer 204 can also modify the configured EDSD instance 210 in a later step. From (4), the data configuration and export process 200 proceeds to (5*a*).

At (5*a*), the DSES 212 reads a configured EDSD instance 210.

At (5*b*), the DSES reads related metadata 202. Export keys are computed recursively at (6), (7), and (8) in a loop.

At (6), the DSES 212 reads the keys of an AO or DB table from a customer DB 214. The AO and key range configured in the EDSD instance 210 is queried. Keys in the selected range are retrieved and written in (8). In a recursive step, the DSES 212 executes a query defined by (7), obtains selected keys, and writes the keys to a DB table export keys 216 at (8).

At (7), the DSES 212 follows defined relations to more AOs to be exported. In a recursive step, already selected keys of a first AO instance are taken, the relation to a second AO is followed, and keys of the second AO instance are selected which are related to the instances of the first AO specified by the already selected keys. The DSES 212 executes code from 202 as specified in the EDSD instance 210 which determines additional keys of related AO instances or DB table entries.

At (8), the DSES 212 stores the determined keys of the AOs and DB tables. For every AO and DB table specified, the DSES 212 writes the identified keys to the export keys 216 DB table. From (8), the data configuration and export process 200 proceeds to (9).

At (9), when the key calculation is done, the DSES 212 notifies (optionally) the customer ML Engineer 204. The customer ML Engineer 204 can evaluate the data set. Alternatively, the customer ML engineer 204 can come back when the keys are ready and check data. The EDSD CT system 208 can read the computed keys and can read the configured attributes and DB fields to visualize actual customer data sets being specified by the computed export keys (in the export keys 216 DB). From (9), the data configuration and export process 200 proceeds to (10).

At (10), the customer ML engineer 204 reviews the selected customer data set. The customer ML engineer 204 can browse through the data (likely on selected instances). The customer ML engineer 204 can view histograms of individual attributes or fields (e.g., to see if the values are interesting for ML; e.g. if all values are identical, the attribute might be obsolete). If the customer ML engineer 204 is not satisfied, the customer ML engineer 204 can return to (3). Else, the customer ML engineer 204 can trigger an export. From (10), the data configuration and export process 200 optionally proceeds to (11) or to (12).

Optionally, at (11), a delta export 218 is computed-keys which had been exported in an earlier run can be skipped during the next export, so only a delta of the newly created content (or delta due to new EDSD configuration) compared to the previous export is created. From (11), the data configuration and export process 200 proceeds to (12).

At (12), the DSES 212 exports the data set. The DSES 212 reads the export keys. For the read keys, specified attributes from the customer data are read and written to an export file data export 220. After (12), the data configuration and export process 200 can stop.

Figure 3:
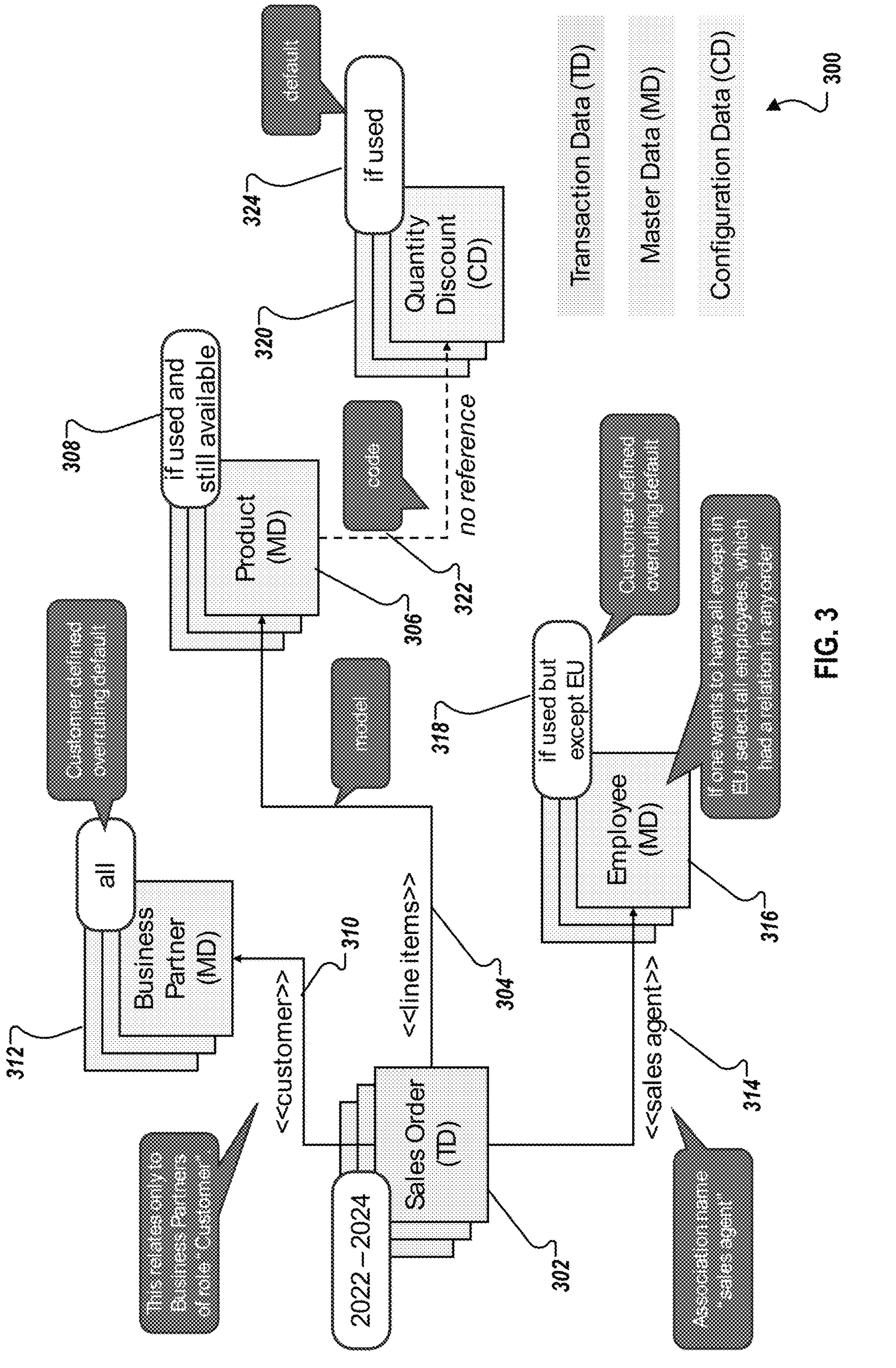
FIG. 3 is a block diagram illustrating an example with relations and filtered associations, according to an implementation of the present disclosure.

FIG. 3 is a block diagram illustrating an example 300 with relations and filtered associations, according to an implementation of the present disclosure. Presented is an example scenario of an ML engineer creating an EDSD: the example scenario is for a software application managing sales orders data, with related customers, sales agents, products and discount configuration. The ML engineer wants to analyze the relation between customers, sales agent, discount, and order volumes.

The Sales Order 302 AO has line items 304, which related to instances of a Product 306 AO. The desired selection for Sales Order 302 is "all Orders in the years 2022 to 2024." The ML engineer wants to select of the Sales Orders 302 all Products 306 that are referenced by the Sales Orders' 302 line items 304, which are still available to be sold today (i.e., no analysis desired on former products, only current). This further restricts the set of Products 306 to be exported beyond the "if used" default 308, which would be to export all referenced Products 306 (but only those).

The Sales Order 302 AO association "customer" 310 leads to the Business Partner 312 AO representing customers. The desired selection for Business Partner 312 is "all" customers. The ML engineer wants to select "all" (e.g. to analyze buying behavior as actual percentages of all customers, not only those who purchased a product in 2022-2024 time range). This overrides the "if used" default 308, which would be to export only referenced customers, so it widens the selection. In this case, all entries in the Business Partner 312 DB table need to be identified, which are referred at least once as a customer in one or more Sales Orders 302 entries.

The Sales Order 302 AO association sales agent 314 leads to the Employee 316 AO. Since the ML engineer is not located in the EU, access to EU citizen data is not permitted, therefore only sales agent data is desired for Employees 316 not located in the EU. This further restricts the "if used" default 318, which would be to export all referenced Employees 316 (but only those).

The Quantity Discount 320 AO is configuring quantity discounts per Product 306 at various levels and rates. The relation between Quantity Discount 320 is (in the provided example) not modeled as a data (key) relation, but lookup is implemented in application code 322. The relation for the data export is provided as a code snippet, determining instances of Quantity Discount 320, which are related to selected instances of Product 306 according to the quantity attribute in the Sales Order 302 line items 304. This is the default behavior 324, including referenced elements if (and only if) they are used.

Figure 4:
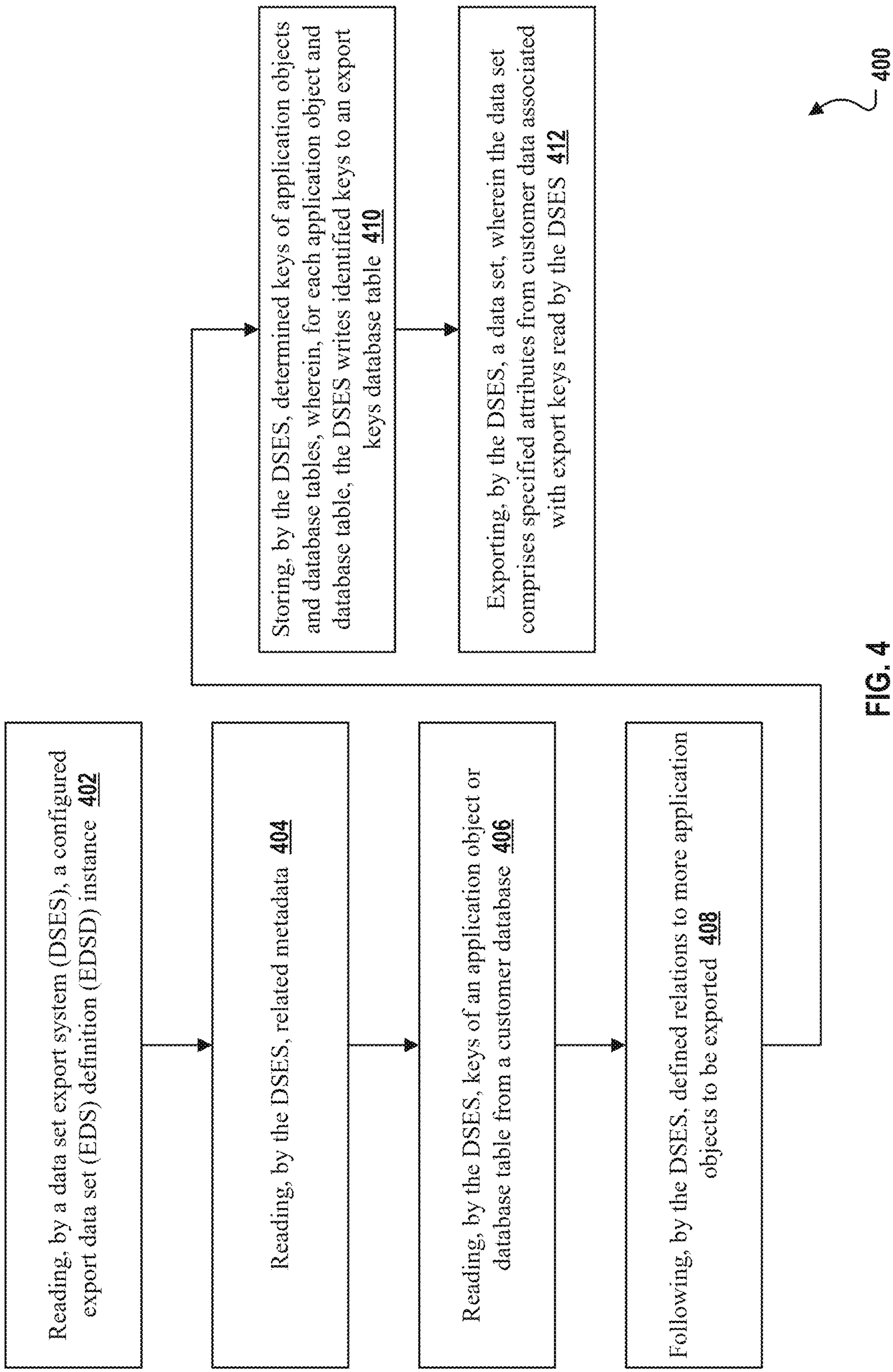
FIG. 4 is a flowchart illustrating an example of a computer-implemented method for consistent selection of subsets of strongly related application data, according to an implementation of the present disclosure.

FIG. 4 is a flowchart illustrating an example of a computer-implemented method 400 for consistent selection of subsets of strongly related application data, according to an implementation of the present disclosure. For clarity of presentation, the description that follows generally describes method 400 in the context of the other figures in this description. However, it will be understood that method 400 can be performed, for example, by any system, environment, software, and hardware, or a combination of systems, environments, software, and hardware, as appropriate. In some implementations, various steps of method 400 can be run in parallel, in combination, in loops, or in any order.

At 402, a data set export system (DSES) reads a configured export data set (EDS) definition (EDSD) instance. In some implementations, the configured EDSD definition was written by an EDSD design time system. From 402, method 400 proceeds to 404.

At 404, the DSES reads related metadata. In some implementations, the related metadata is defined and/or stored by an EDSD developer. From 404, method 400 proceeds to 406.

At 406, the DSES reads keys of an application object or database table from a customer database. In some implementations, with respect to reading, by the DSES, keys of an application object or database table from a customer database, recursively: 1) the DSES executes a query obtained by following, by the DSES, defined relations to more application objects to be exported; and 2) the DSES stores determined keys of application objects and database tables, into the export keys database table. From 406, method 400 proceeds to 408.

At 408, the DSES follows defined relations to more application objects to be exported. In some implementations, with respect to the following, by the DSES, defined relations to more application objects to be exported, recursively, for already selected keys of a first application object are taken, following a relation to a second application object, and selecting keys of the second application object. In some implementations, the DSES executes code associated with the related metadata as specified in the EDSD instance to determine additional keys of related application object instances or database table entries. From 408, method 400 proceeds to 410.

At 410, the DSES stores determined keys of application objects and database tables, where, for each application object and database table, the DSES writes identified keys to an export keys database table. In some implementations, a computing a delta export is optionally computed. From 410, method 400 proceeds to 412.

At 412, exporting, by the DSES exports a data set, where the data set includes specified attributes from customer data associated with export keys read by the DSES. After 412, method 400 can stop.

Figure 5:
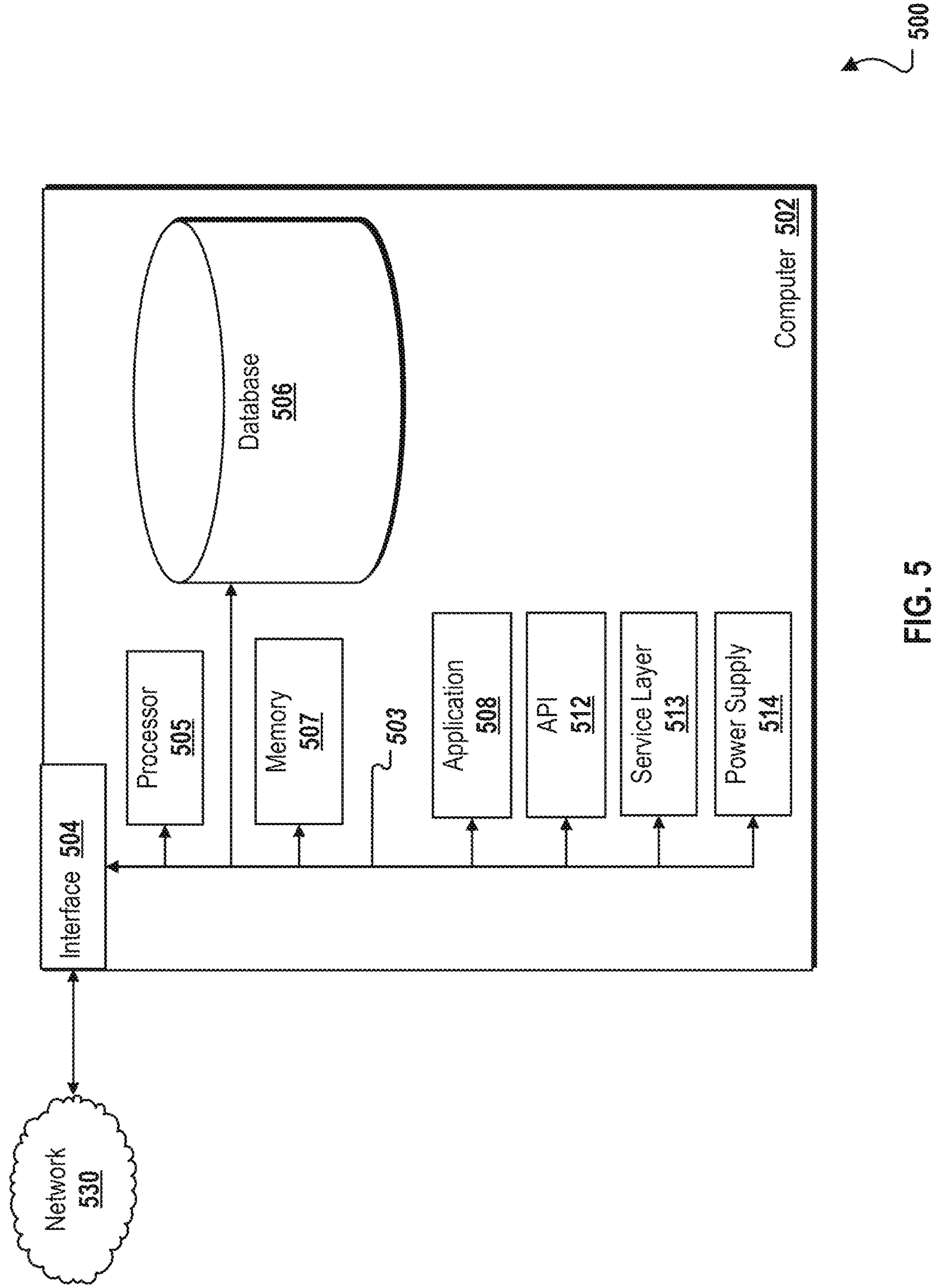
FIG. 5 is a block diagram illustrating an example of a computer-implemented system used to provide computational functionalities associated with described algorithms, methods, functions, processes, flows, and procedures, according to an implementation of the present disclosure.

FIG. 5 is a block diagram illustrating an example of a computer-implemented System 500 used to provide computational functionalities associated with described algorithms, methods, functions, processes, flows, and procedures, according to an implementation of the present disclosure. In the illustrated implementation, computer-implemented system 500 includes a Computer 502 and a Network 530.

The illustrated Computer 502 is intended to encompass any computing device, such as a server, desktop computer, laptop/notebook computer, wireless data port, smart phone, personal data assistant (PDA), tablet computer, one or more processors within these devices, or a combination of computing devices, including physical or virtual instances of the computing device, or a combination of physical or virtual instances of the computing device. Additionally, the Computer 502 can include an input device, such as a keypad, keyboard, or touch screen, or a combination of input devices that can accept user information, and an output device that conveys information associated with the operation of the Computer 502, including digital data, visual, audio, another type of information, or a combination of types of information, on a graphical-type user interface (UI) (or GUI) or other UI.

The Computer 502 can serve in a role in a distributed computing system as, for example, a client, network component, a server, or a database or another persistency, or a combination of roles for performing the subject matter described in the present disclosure. The illustrated Computer 502 is communicably coupled with a Network 530. In some implementations, one or more components of the Computer 502 can be configured to operate within an environment, or a combination of environments, including cloud-computing, local, or global.

At a high level, the Computer 502 is an electronic computing device operable to receive, transmit, process, store, or manage data and information associated with the described subject matter. According to some implementations, the Computer 502 can also include or be communicably coupled with a server, such as an application server, e-mail server, web server, caching server, or streaming data server, or a combination of servers.

The Computer 502 can receive requests over Network 530 (for example, from a client software application executing on another Computer 502) and respond to the received requests by processing the received requests using a software application or a combination of software applications. In addition, requests can also be sent to the Computer 502 from internal users (for example, from a command console or by another internal access method), external or third-parties, or other entities, individuals, systems, or computers.

Each of the components of the Computer 502 can communicate using a System Bus 503. In some implementations, any or all of the components of the Computer 502, including hardware, software, or a combination of hardware and software, can interface over the System Bus 503 using an application programming interface (API) 512, a Service Layer 513, or a combination of the API 512 and Service Layer 513. The API 512 can include specifications for routines, data structures, and object classes. The API 512 can be either computer-language independent or dependent and refer to a complete interface, a single function, or even a set of APIs. The Service Layer 513 provides software services to the Computer 502 or other components (whether illustrated or not) that are communicably coupled to the Computer 502. The functionality of the Computer 502 can be accessible for all service consumers using the Service Layer 513. Software services, such as those provided by the Service Layer 513, provide reusable, defined functionalities through a defined interface. For example, the interface can be software written in a computing language (for example JAVA or C++) or a combination of computing languages, and providing data in a particular format (for example, extensible markup language (XML)) or a combination of formats. While illustrated as an integrated component of the Computer 502, alternative implementations can illustrate the API 512 or the Service Layer 513 as stand-alone components in relation to other components of the Computer 502 or other components (whether illustrated or not) that are communicably coupled to the Computer 502. Moreover, any or all parts of the API 512 or the Service Layer 513 can be implemented as a child or a sub-module of another software module, enterprise application, or hardware module without departing from the scope of the present disclosure.

The Computer 502 includes an Interface 504. Although illustrated as a single Interface 504, two or more Interfaces 504 can be used according to particular needs, desires, or particular implementations of the Computer 502. The Interface 504 is used by the Computer 502 for communicating with another computing system (whether illustrated or not) that is communicatively linked to the Network 530 in a distributed environment. Generally, the Interface 504 is operable to communicate with the Network 530 and includes logic encoded in software, hardware, or a combination of software and hardware. More specifically, the Interface 504 can include software supporting one or more communication protocols associated with communications such that the Network 530 or hardware of Interface 504 is operable to communicate physical signals within and outside of the illustrated Computer 502.

The Computer 502 includes a Processor 505. Although illustrated as a single Processor 505, two or more Processors 505 can be used according to particular needs, desires, or particular implementations of the Computer 502. Generally, the Processor 505 executes instructions and manipulates data to perform the operations of the Computer 502 and any algorithms, methods, functions, processes, flows, and procedures as described in the present disclosure.

The Computer 502 also includes a Database 506 that can hold data for the Computer 502, another component communicatively linked to the Network 530 (whether illustrated or not), or a combination of the Computer 502 and another component. For example, Database 506 can be an in-memory or conventional database storing data consistent with the present disclosure. In some implementations, Database 506 can be a combination of two or more different database types (for example, a hybrid in-memory and conventional database) according to particular needs, desires, or particular implementations of the Computer 502 and the described functionality. Although illustrated as a single Database 506, two or more databases of similar or differing types can be used according to particular needs, desires, or particular implementations of the Computer 502 and the described functionality. While Database 506 is illustrated as an integral component of the Computer 502, in alternative implementations, Database 506 can be external to the Computer 502. The Database 506 can hold and operate on at least any data type mentioned or any data type consistent with this disclosure.

The Computer 502 also includes a Memory 507 that can hold data for the Computer 502, another component or components communicatively linked to the Network 530 (whether illustrated or not), or a combination of the Computer 502 and another component. Memory 507 can store any data consistent with the present disclosure. In some implementations, Memory 507 can be a combination of two or more different types of memory (for example, a combination of semiconductor and magnetic storage) according to particular needs, desires, or particular implementations of the Computer 502 and the described functionality. Although illustrated as a single Memory 507, two or more Memories 507 or similar or differing types can be used according to particular needs, desires, or particular implementations of the Computer 502 and the described functionality. While Memory 507 is illustrated as an integral component of the Computer 502, in alternative implementations, Memory 507 can be external to the Computer 502.

The Application 508 is an algorithmic software engine providing functionality according to particular needs, desires, or particular implementations of the Computer 502, particularly with respect to functionality described in the present disclosure. For example, Application 508 can serve as one or more components, modules, or applications. Further, although illustrated as a single Application 508, the Application 508 can be implemented as multiple Applications 508 on the Computer 502. In addition, although illustrated as integral to the Computer 502, in alternative implementations, the Application 508 can be external to the Computer 502.

The Computer 502 can also include a Power Supply 514. The Power Supply 514 can include a rechargeable or non-rechargeable battery that can be configured to be either user- or non-user-replaceable. In some implementations, the Power Supply 514 can include power-conversion or management circuits (including recharging, standby, or another power management functionality). In some implementations, the Power Supply 514 can include a power plug to allow the Computer 502 to be plugged into a wall socket or another power source to, for example, power the Computer 502 or recharge a rechargeable battery.

There can be any number of Computers 502 associated with, or external to, a computer system containing Computer 502, each Computer 502 communicating over Network 530. Further, the term "client," "user," or other appropriate terminology can be used interchangeably, as appropriate, without departing from the scope of the present disclosure. Moreover, the present disclosure contemplates that many users can use one Computer 502, or that one user can use multiple computers 502.

Described implementations of the subject matter can include one or more features, alone or in combination.

For example, in a first implementation, a computer-implemented method for data configuration and export, comprising: reading, by a data set export system (DSES), a configured export data set (EDS) definition (EDSD) instance; reading, by the DSES, related metadata; reading, by the DSES, keys of an application object or database table from a customer database; following, by the DSES, defined relations to more application objects to be exported; storing, by the DSES, determined keys of application objects and database tables, wherein, for each application object and database table, the DSES writes identified keys to an export keys database table; and exporting, by the DSES, a data set, wherein the data set comprises specified attributes from customer data associated with export keys read by the DSES.

The foregoing and other described implementations can each, optionally, include one or more of the following features:

A first feature, combinable with any of the following features, wherein the configured EDSD definition was written by an EDSD design time system.

A second feature, combinable with any of the previous or following features, wherein the related metadata is defined and/or stored by an EDSD developer.

A third feature, combinable with any of the previous or following features, wherein, with respect to reading, by the DSES, keys of an application object or database table from a customer database, recursively: executing, by the DSES, a query obtained by following, by the DSES, defined relations to more application objects to be exported; and storing, by the DSES, determined keys of application objects and database tables, into the export keys database table.

A fourth feature, combinable with any of the previous or following features, wherein, with respect to the following, by the DSES, defined relations to more application objects to be exported, recursively: for already selected keys of a first application object are taken, a relation to a second application object is followed, and keys of the second application object are selected.

A fifth feature, combinable with any of the previous or following features, wherein the DSES executes code associated with the related metadata as specified in the EDSD instance to determine additional keys of related application object instances or database table entries.

A sixth feature, combinable with any of the previous or following features, comprising optionally computing a delta export.

In a second implementation, a non-transitory, computer-readable medium storing one or more instructions executable by a computer system to perform one or more operations, comprising: reading, by a data set export system (DSES), a configured export data set (EDS) definition (EDSD) instance; reading, by the DSES, related metadata; reading, by the DSES, keys of an application object or database table from a customer database; following, by the DSES, defined relations to more application objects to be exported; storing, by the DSES, determined keys of application objects and database tables, wherein, for each application object and database table, the DSES writes identified keys to an export keys database table; and exporting, by the DSES, a data set, wherein the data set comprises specified attributes from customer data associated with export keys read by the DSES.

The foregoing and other described implementations can each, optionally, include one or more of the following features:

A first feature, combinable with any of the following features, wherein the configured EDSD definition was written by an EDSD design time system.

A second feature, combinable with any of the previous or following features, wherein the related metadata is defined and/or stored by an EDSD developer.

A third feature, combinable with any of the previous or following features, wherein, with respect to reading, by the DSES, keys of an application object or database table from a customer database, recursively: executing, by the DSES, a query obtained by following, by the DSES, defined relations to more application objects to be exported; and storing, by the DSES, determined keys of application objects and database tables, into the export keys database table.

A fourth feature, combinable with any of the previous or following features, wherein, with respect to the following, by the DSES, defined relations to more application objects to be exported, recursively: for already selected keys of a first application object are taken, a relation to a second application object is followed, and keys of the second application object are selected.

A fifth feature, combinable with any of the previous or following features, wherein the DSES executes code associated with the related metadata as specified in the EDSD instance to determine additional keys of related application object instances or database table entries.

A sixth feature, combinable with any of the previous or following features, comprising optionally computing a delta export.

In a third implementation, a computer-implemented system, comprising: one or more computers; and one or more computer memory devices interoperably coupled with the one or more computers and having tangible, non-transitory, machine-readable media storing one or more instructions that, when executed by the one or more computers, perform one or more operations, comprising: reading, by a data set export system (DSES), a configured export data set (EDS) definition (EDSD) instance; reading, by the DSES, related metadata; reading, by the DSES, keys of an application object or database table from a customer database; following, by the DSES, defined relations to more application objects to be exported; storing, by the DSES, determined keys of application objects and database tables, wherein, for each application object and database table, the DSES writes identified keys to an export keys database table; and exporting, by the DSES, a data set, wherein the data set comprises specified attributes from customer data associated with export keys read by the DSES.

The foregoing and other described implementations can each, optionally, include one or more of the following features:

A first feature, combinable with any of the following features, wherein the configured EDSD definition was written by an EDSD design time system.

A second feature, combinable with any of the previous or following features, wherein the related metadata is defined and/or stored by an EDSD developer.

A third feature, combinable with any of the previous or following features, wherein, with respect to reading, by the DSES, keys of an application object or database table from a customer database, recursively: executing, by the DSES, a query obtained by following, by the DSES, defined relations to more application objects to be exported; and storing, by the DSES, determined keys of application objects and database tables, into the export keys database table.

A fourth feature, combinable with any of the previous or following features, wherein, with respect to the following, by the DSES, defined relations to more application objects to be exported, recursively: for already selected keys of a first application object are taken, a relation to a second application object is followed, and keys of the second application object are selected.

A fifth feature, combinable with any of the previous or following features, wherein the DSES executes code associated with the related metadata as specified in the EDSD instance to determine additional keys of related application object instances or database table entries.

A sixth feature, combinable with any of the previous or following features, comprising optionally computing a delta export.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Software implementations of the described subject matter can be implemented as one or more computer programs, that is, one or more modules of computer program instructions encoded on a tangible, non-transitory, computer-readable medium for execution by, or to control the operation of, a computer or computer-implemented system. Alternatively, or additionally, the program instructions can be encoded in/on an artificially generated propagated signal, for example, a machine-generated electrical, optical, or electromagnetic signal that is generated to encode information for transmission to a receiver apparatus for execution by a computer or computer-implemented system. The computer-storage medium can be a machine-readable storage device, a machine-readable storage substrate, a random or serial access memory device, or a combination of computer-storage mediums. Configuring one or more computers means that the one or more computers have installed hardware, firmware, or software (or combinations of hardware, firmware, and software) so that when the software is executed by the one or more computers, particular computing operations are performed. The computer storage medium is not, however, a propagated signal.

The term "real-time," "real time," "realtime," "real (fast) time (RFT)," "near(ly) real-time (NRT)," "quasi real-time," or similar terms (as understood by one of ordinary skill in the art), means that an action and a response are temporally proximate such that an individual perceives the action and the response occurring substantially simultaneously. For example, the time difference for a response to display (or for an initiation of a display) of data following the individual's action to access the data can be less than 1 millisecond (ms), less than 1 second (s), or less than 5 s. While the requested data need not be displayed (or initiated for display) instantaneously, it is displayed (or initiated for display) without any intentional delay, taking into account processing limitations of a described computing system and time required to, for example, gather, accurately measure, analyze, process, store, or transmit the data.

The terms "data processing apparatus," "computer," "computing device," or "electronic computer device" (or an equivalent term as understood by one of ordinary skill in the art) refer to data processing hardware and encompass all kinds of apparatuses, devices, and machines for processing data, including by way of example, a programmable processor, a computer, or multiple processors or computers. The computer can also be, or further include special-purpose logic circuitry, for example, a central processing unit (CPU), a field-programmable gate array (FPGA), or an application-specific integrated circuit (ASIC). In some implementations, the computer or computer-implemented system or special-purpose logic circuitry (or a combination of the computer or computer-implemented system and special-purpose logic circuitry) can be hardware- or software-based (or a combination of both hardware- and software-based). The computer can optionally include code that creates an execution environment for computer programs, for example, code that constitutes processor firmware, a protocol stack, a database management system, an operating system, or a combination of execution environments. The present disclosure contemplates the use of a computer or computer-implemented system with an operating system, for example LINUX, UNIX, WINDOWS, MAC OS, ANDROID, or IOS, or a combination of operating systems.

A computer program, which can also be referred to or described as a program, software, a software application, a unit, a module, a software module, a script, code, or other component can be written in any form of programming language, including compiled or interpreted languages, or declarative or procedural languages, and it can be deployed in any form, including, for example, as a stand-alone program, module, component, or subroutine, for use in a computing environment. A computer program can, but need not, correspond to a file in a file system. A program can be stored in a portion of a file that holds other programs or data, for example, one or more scripts stored in a markup language document, in a single file dedicated to the program in question, or in multiple coordinated files, for example, files that store one or more modules, sub-programs, or portions of code. A computer program can be deployed to be executed on one computer or on multiple computers that are located at one site or distributed across multiple sites and interconnected by a communication network.

While portions of the programs illustrated in the various figures can be illustrated as individual components, such as units or modules, that implement described features and functionality using various objects, methods, or other processes, the programs can instead include a number of sub-units, sub-modules, third-party services, components, libraries, and other components, as appropriate. Conversely, the features and functionality of various components can be combined into single components, as appropriate. Thresholds used to make computational determinations can be statically, dynamically, or both statically and dynamically determined.

Described methods, processes, or logic flows represent one or more examples of functionality consistent with the present disclosure and are not intended to limit the disclosure to the described or illustrated implementations, but to be accorded the widest scope consistent with described principles and features. The described methods, processes, or logic flows can be performed by one or more programmable computers executing one or more computer programs to perform functions by operating on input data and generating output data. The methods, processes, or logic flows can also be performed by, and computers can also be implemented as, special-purpose logic circuitry, for example, a CPU, an FPGA, or an ASIC.

Computers for the execution of a computer program can be based on general or special-purpose microprocessors, both, or another type of CPU. Generally, a CPU will receive instructions and data from and write to a memory. The essential elements of a computer are a CPU, for performing or executing instructions, and one or more memory devices for storing instructions and data. Generally, a computer will also include, or be operatively coupled to, receive data from or transfer data to, or both, one or more mass storage devices for storing data, for example, magnetic, magneto-optical disks, or optical disks. However, a computer need not have such devices. Moreover, a computer can be embedded in another device, for example, a mobile telephone, a personal digital assistant (PDA), a mobile audio or video player, a game console, a global positioning system (GPS) receiver, or a portable memory storage device, for example, a universal serial bus (USB) flash drive, to name just a few.

Non-transitory computer-readable media for storing computer program instructions: and data can include all forms of permanent/non-permanent or volatile/non-volatile memory, media and memory devices, including by way of example semiconductor memory devices, for example, random access memory (RAM), read-only memory (ROM), phase change memory (PRAM), static random access memory (SRAM), dynamic random access memory (DRAM), erasable programmable read-only memory (EPROM), electrically erasable programmable read-only memory (EEPROM), and flash memory devices; magnetic devices, for example, tape, cartridges, cassettes, internal/removable disks; magneto-optical disks; and optical memory devices, for example, digital versatile/video disc (DVD), compact disc (CD)-ROM, DVD+/-R, DVD-RAM, DVD-ROM, high-definition/density (HD)-DVD, and BLU-RAY/BLU-RAY DISC (BD), and other optical memory technologies. The memory can store various objects or data, including caches, classes, frameworks, applications, modules, backup data, jobs, web pages, web page templates, data structures, database tables, repositories storing dynamic information, or other appropriate information including any parameters, variables, algorithms, instructions, rules, constraints, or references. Additionally, the memory can include other appropriate data, such as logs, policies, security or access data, or reporting files. The processor and the memory can be supplemented by, or incorporated in, special-purpose logic circuitry.

To provide for interaction with a user, implementations of the subject matter described in this specification can be implemented on a computer having a display device, for example, a cathode ray tube (CRT), liquid crystal display (LCD), light emitting diode (LED), or plasma monitor, for displaying information to the user and a keyboard and a pointing device, for example, a mouse, trackball, or trackpad by which the user can provide input to the computer. Input can also be provided to the computer using a touchscreen, such as a tablet computer surface with pressure sensitivity or a multi-touch screen using capacitive or electric sensing. Other types of devices can be used to interact with the user. For example, feedback provided to the user can be any form of sensory feedback (such as, visual, auditory, tactile, or a combination of feedback types). Input from the user can be received in any form, including acoustic, speech, or tactile input. In addition, a computer can interact with the user by sending documents to and receiving documents from a client computing device that is used by the user (for example, by sending web pages to a web browser on a user's mobile computing device in response to requests received from the web browser).

The term "graphical user interface (GUI) can be used in the singular or the plural to describe one or more graphical user interfaces and each of the displays of a particular graphical user interface. Therefore, a GUI can represent any graphical user interface, including but not limited to, a web browser, a touch screen, or a command line interface (CLI) that processes information and efficiently presents the information results to the user. In general, a GUI can include a number of user interface (UI) elements, some or all associated with a web browser, such as interactive fields, pull-down lists, and buttons. These and other UI elements can be related to or represent the functions of the web browser.

Implementations of the subject matter described in this specification can be implemented in a computing system that includes a back-end component, for example, as a data server, or that includes a middleware component, for example, an application server, or that includes a front-end component, for example, a client computer having a graphical user interface or a Web browser through which a user can interact with an implementation of the subject matter described in this specification, or any combination of one or more such back-end, middleware, or front-end components. The components of the system can be interconnected by any form or medium of wireline or wireless digital data communication (or a combination of data communication), for example, a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) using, for example, 802.11x or other protocols, all or a portion of the Internet, another communication network, or a combination of communication networks. The communication network can communicate with, for example, Internet Protocol (IP) packets, frame relay frames, Asynchronous Transfer Mode (ATM) cells, voice, video, data, or other information between network nodes.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any inventive concept or on the scope of what can be claimed, but rather as descriptions of features that can be specific to particular implementations of particular inventive concepts. Certain features that are described in this specification in the context of separate implementations can also be implemented, in combination, in a single implementation. Conversely, various features that are described in the context of a single implementation can also be implemented in multiple implementations, separately, or in any sub-combination. Moreover, although previously described features can be described as acting in certain combinations and even initially claimed as such, one or more features from a claimed combination can, in some cases, be excised from the combination, and the claimed combination can be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations can be considered optional), to achieve desirable results. In certain circumstances, multitasking or parallel processing (or a combination of multitasking and parallel processing) can be advantageous and performed as deemed appropriate.

The separation or integration of various system modules and components in the previously described implementations should not be understood as requiring such separation or integration in all implementations, and it should be understood that the described program components and systems can generally be integrated together in a single software product or packaged into multiple software products.

Accordingly, the previously described example implementations do not define or constrain the present disclosure. Other changes, substitutions, and alterations are also possible without departing from the scope of the present disclosure.

Furthermore, any claimed implementation is considered to be applicable to at least a computer-implemented method; a non-transitory, computer-readable medium storing computer-readable instructions to perform the computer-implemented method; and a computer system comprising a computer memory interoperably coupled with a hardware processor configured to perform the computer-implemented method or the instructions stored on the non-transitory, computer-readable medium.

What is claimed is:

1. A computer-implemented method for data configuration and export, comprising:

reading, by a data set export system (DSES), a configured export data set (EDS) definition (EDSD) instance;

reading, by the DSES, related metadata;

reading, by the DSES, keys of an application object or database table from a customer database;

following, by the DSES, defined relations to more application objects to be exported;

storing, by the DSES, determined keys of application objects and database tables, wherein, for each application object and database table, the DSES writes identified keys to an export keys database table in a key-determination phase; and exporting, by the DSES, a data set in a data export phase subsequent to the key-determination phase, wherein the data set comprises specified attributes from customer data retrieved by querying the customer database using the export keys read by the DSES from the export keys database table.

2. The computer-implemented method of claim 1, wherein the configured EDSD was written by an EDSD design time system.

3. The computer-implemented method of claim 1, wherein the related metadata is defined and/or stored by an EDSD developer.

4. The computer-implemented method of claim 1, wherein, with respect to reading, by the DSES, keys of an application object or database table from a customer database, recursively:

executing, by the DSES, a query obtained by following, by the DSES, defined relations to more application objects to be exported; and storing, by the DSES, determined keys of application objects and database tables, into the export keys database table.

5. The computer-implemented method of claim 1, wherein, with respect to the following, by the DSES, defined relations to more application objects to be exported, recursively:

for already selected keys of a first application object are taken, a relation to a second application object is followed, and keys of the second application object are selected.

6. The computer-implemented method of claim 5, wherein the DSES executes code associated with the related metadata as specified in the EDSD instance to determine additional keys of related application object instances or database table entries.

7. The computer-implemented method of claim 1, comprising optionally computing a delta export.

8. A non-transitory, computer-readable medium storing one or more instructions executable by a computer system to perform one or more operations, comprising:

reading, by a data set export system (DSES), a configured export data set (EDS) definition (EDSD) instance;

reading, by the DSES, related metadata;

reading, by the DSES, keys of an application object or database table from a customer database;

following, by the DSES, defined relations to more application objects to be exported;

storing, by the DSES, determined keys of application objects and database tables, wherein, for each application object and database table, the DSES writes identified keys to an export keys database table in a key-determination phase; and exporting, by the DSES, a data set in a data export phase subsequent to the key-determination phase, wherein the data set comprises specified attributes from customer data retrieved by querying the customer database using the export keys read by the DSES from the export keys database table.

9. The non-transitory, computer-readable medium of claim 8, wherein the configured EDSD was written by an EDSD design time system.

10. The non-transitory, computer-readable medium of claim 8, wherein the related metadata is defined and/or stored by an EDSD developer.

11. The non-transitory, computer-readable medium of claim 8, wherein, with respect to reading, by the DSES, keys of an application object or database table from a customer database, recursively:

executing, by the DSES, a query obtained by following, by the DSES, defined relations to more application objects to be exported; and storing, by the DSES, determined keys of application objects and database tables, into the export keys database table.

12. The non-transitory, computer-readable medium of claim 8, wherein, with respect to the following, by the DSES, defined relations to more application objects to be exported, recursively:

for already selected keys of a first application object are taken, a relation to a second application object is followed, and keys of the second application object are selected.

13. The non-transitory, computer-readable medium of claim 12, wherein the DSES executes code associated with the related metadata as specified in the EDSD instance to determine additional keys of related application object instances or database table entries.

14. The non-transitory, computer-readable medium of claim 8, comprising optionally computing a delta export.

15. A computer-implemented system, comprising:

one or more computers; and one or more computer memory devices interoperably coupled with the one or more computers and having tangible, non-transitory, machine-readable media storing one or more instructions that, when executed by the one or more computers, perform one or more operations, comprising:

reading, by a data set export system (DSES), a configured export data set (EDS) definition (EDSD) instance;

reading, by the DSES, related metadata;

reading, by the DSES, keys of an application object or database table from a customer database;

following, by the DSES, defined relations to more application objects to be exported;

storing, by the DSES, determined keys of application objects and database tables, wherein, for each application object and database table, the DSES writes identified keys to an export keys database table in a key-determination phase; and exporting, by the DSES, a data set in a data export phase subsequent to the key-determination phase, wherein the data set comprises specified attributes from customer data retrieved by querying the customer database using the export keys read by the DSES from the export keys database table.

16. The computer-implemented system of claim 15, wherein the configured EDSD was written by an EDSD design time system.

17. The computer-implemented system of claim 15, wherein the related metadata is defined and/or stored by an EDSD developer.

18. The computer-implemented system of claim 15, wherein, with respect to reading, by the DSES, keys of an application object or database table from a customer database, recursively:

executing, by the DSES, a query obtained by following, by the DSES, defined relations to more application objects to be exported; and storing, by the DSES, determined keys of application objects and database tables, into the export keys database table.

19. The computer-implemented system of claim 15, wherein, with respect to the following, by the DSES, defined relations to more application objects to be exported, recursively:

for already selected keys of a first application object are taken, a relation to a second application object is followed, and keys of the second application object are selected.

20. The computer-implemented system of claim 19, wherein the DSES executes code associated with the related metadata as specified in the EDSD instance to determine additional keys of related application object instances or database table entries.

* * * * *